United States Patent
Satoh

(12) 
(10) Patent No.: US 6,315,440 B1
(45) Date of Patent: Nov. 13, 2001

(54) MULTICOLORED ILLUMINATOR AND PORTABLE INFORMATION APPARATUS HAVING THE SAME

(75) Inventor: Noriyoshi Satoh, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/499,400

(22) Filed: Feb. 7, 2000

(30) Foreign Application Priority Data

Feb. 16, 1999 (JP) .................................................. 11-037502

(51) Int. Cl.[7] ....................................................... F21V 8/00
(52) U.S. Cl. ............................ 362/561; 362/231; 362/31; 349/65
(58) Field of Search ................................. 362/230, 231, 362/561, 235, 244, 249, 31; 349/62, 65, 68, 69

(56) References Cited

U.S. PATENT DOCUMENTS

| | | | |
|---|---|---|---|
| 5,375,043 | * 12/1994 | Tokunaga | 362/31 |
| 5,453,855 | * 9/1995 | Nakamura et al. | 349/62 |
| 5,921,652 | * 7/1999 | Parker et al. | 362/31 |
| 5,975,711 | * 11/1999 | Parker et al. | 362/31 |
| 6,129,444 | * 10/2000 | Tognoni | 362/231 |

FOREIGN PATENT DOCUMENTS

| | | |
|---|---|---|
| 5-136728 | 6/1993 | (JP) . |
| 6-204910 | 7/1994 | (JP) . |
| 9-203899 | 8/1997 | (JP) . |

* cited by examiner

*Primary Examiner*—Alan Cariaso
(74) *Attorney, Agent, or Firm*—Pearne & Gordon LLP

(57) ABSTRACT

An illuminator comprises: a printed board 9; light-emitting element bodies 23 mounted on this printed board 9 and each including a plurality of light-emitting elements which are different in wave length and which are formed integrally; a light guide 20 having a light guiding means for guiding light from these light-emitting element bodies 23 as light sources onto a predetermined surface; and a substantially rectangular liquid crystal display 19 held by this light guide 20 and for displaying characters, symbols, figures, etc. while being illuminated by the light guide means, wherein the plurality of light-emitting element bodies 23 are disposed at intervals along one side of this liquid crystal display 19 so as to face in one and the same direction.

9 Claims, 7 Drawing Sheets

MULTICOLORED ILLUMINATOR AND PORTABLE INFORMATION APPARATUS HAVING THE SAME

BACKGROUND OF THE INVENTION

The present invention relates to an illuminator used in a portable electronic apparatus or the like such as a portable telephone, a pocket bell or the like, and particularly relates to an illuminator in which a liquid crystal display for displaying characters, symbols, etc. is illuminated by use of light-emitting element bodies in each of which a plurality of light-emitting elements different in wave length are formed integrally.

Besides background-art portable telephones in which a display portion includes a ringer device for sending out a ringing sound from a sounding body such as a speaker, an piezoelectric buzzer or the like so as to give information, JP-A-5-136728 discloses a portable telephone in which light sources having at least two kinds of light source colors for illuminating a display are changed over sequentially in a cyclic manner so as to give information. Moreover, JP-A-6-204910 discloses means for informing a user only of a change of the color of emitted light so as to give information about the operating conditions of the apparatus.

JP-A-9-203899 discloses an LCD display or the like as a structure for illuminating such a display, the LCD display being incorporated with a light guide plate provided with a curved surface for guiding light from LED elements.

In the structure described above, the display can be illuminated, but there is disclosed no means for illuminating characters or symbols displayed on the display or the vicinities of the characters or symbols uniformly. Accordingly, such a structure could inform the user only of the fact that the light source color had been changed over, or the user could recognize only the fact that the light source color had been changed over. Therefore, there was a problem that the displayed characters, symbols, etc. could not be read clearly.

Particularly in a display of a portable telephone which has a function of displaying a phone number of a caller, etc. when there is a call, characters cannot be read correctly if illumination light has light and shade in a displayed area. Accordingly, there was a case where the color shading of the illumination light obstructs user's reading of characters, symbols, figures, etc. displayed to be essentially given to and read by a user. Further, there was a case where the portable telephone was degraded if there was a color shading in the display portion also serving as the exterior of the portable telephone.

Although such a color shading can be avoided if light-emitting elements are disposed continuously as measures against the color shading, use of numerous light-emitting elements increases the cost. In addition, for example, the portable telephone is manufactured to have the width of from about 30 to about 50 mm so as to be gripped and operated by one hand, and the display portion is also formed to have the same width as described above.

However, a warp is generated in the case where the light-emitting elements are formed into a single light-emitting element body in order to illuminate the display portion having this width. Parts are generally mounted on a printed board by reflowing through front-mount technique. However, if there is a warp in the parts, a failure in soldering is incurred so that the parts cannot be mounted normally.

SUMMARY OF THE INVENTION

Taking the foregoing problems into consideration, it is an object of the present invention to provide an illuminator in which, though a liquid crystal display is illuminated with a plurality of colors by light-emitting element bodies each constituted by a plurality of light-emitting elements, characters, symbols, etc. can be displayed so that a user can read the displayed characters, symbols, figures, etc. reliably and clearly and in which the size thereof is prevented from increasing, and to provide a portable information apparatus having such an illuminator.

In order to achieve the above object, according to the invention, there is provided an illuminator comprising: a printed board; a plurality of light-emitting groups, each of the light-emitting groups being mounted on the printed board and constituted by a plurality of light-emitting elements which are different in wave length of the light and disposed at predetermined intervals; light guide means using the light-emitting element groups as light sources and guiding lights from the light-emitting element groups onto a predetermined surface; and a substantially rectangular liquid crystal display for displaying characters, symbols, figures, etc. while being illuminated by the light guide means; the light-emitting element groups being disposed at intervals along one side of the rectangular liquid crystal display.

Thus, according to the invention, a combined point where light emitted from one light-emitting element and light emitted from another light-emitting element are combined can be made shortest from the light-emitting elements.

Further, according to the invention, there is provided an illuminator comprising: a printed board; light-emitting element bodies being mounted on the printed board and constituted by a plurality of light-emitting elements which are different in wave length and provided integrally with each other; light guide means using the light-emitting element bodies as light sources and guiding lights from the light-emitting element bodies onto a predetermined surface; and a substantially rectangular liquid crystal display for displaying characters, symbols, figures, etc. while being illuminated by the light guide means; the light-emitting element bodies being disposed at intervals along one side of the rectangular liquid crystal display.

Thus, according to the invention, a combined point where light emitted from one light-emitting element and light emitted from another light-emitting element are combined can be set to be closest from the light-emitting elements. Further, the number of parts can be reduced.

Preferably, at least three light-emitting element bodies are disposed at intervals along one side of the rectangular liquid crystal display.

Thus, color shading and unevenness in brightness can be eliminated all over the display area, so that characters, symbols, figures, etc. displayed on the display can be read clearly.

Further, preferably, the light-emitting elements can emit light concurrently.

Thus, illumination can be made with the larger number of kinds of light colors than the number of kinds of the light-emitting elements.

Furthermore, currents flowing into the light emitting elements are controlled to thereby change the intensity of illumination light.

Thus, a combined point of lights is fixed so that the display area can be illuminated uniformly with innumerable kinds of light without causing any color shading or unevenness in brightness.

Moreover, a portable information apparatus of the present invention is configured to have an illuminator as mentioned above.

Thus, the display area can be illuminated uniformly without increasing current consumption in the portable information apparatus and without causing any color shading or unevenness in brightness.

DETAILED DESCRIPTION OF THE PREFERRED EMBODIMENTS

Figure 1:
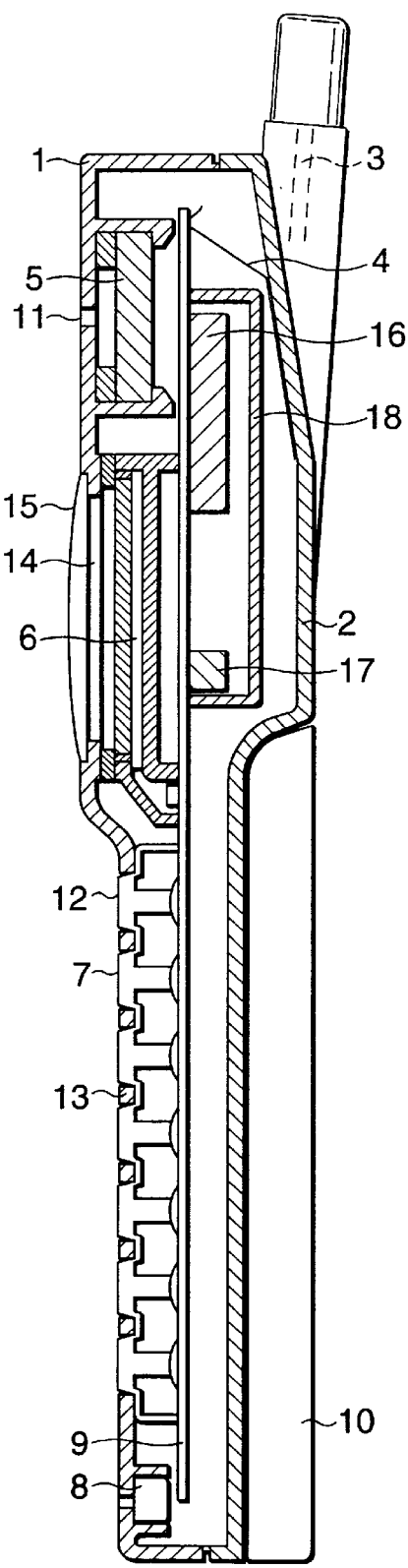
FIG. 1 is a longitudinal side sectional view of a portable telephone provided with an illuminator according to an embodiment of the present invention.

Description will be made below about an embodiment of the present invention with reference to the drawings. FIG. 1 shows a longitudinally side sectional view of a portable information apparatus (also referred to as "apparatus" simply), for example, a portable telephone, having an illuminator according to an embodiment of the present invention.

In FIG. 1, a housing constituted by an upper casing 1 and a lower casing 2 receives a transmitting/receiving antenna 3, a receiving antenna 4, a receiver 5 for outputting voice, a liquid crystal display portion 6 for displaying characters, symbols, etc., a key sheet 7 on which characters and symbols are printed, a transmitter 8, a main-body printed board 9, and so on. A battery 10 for supplying electric power is attached to the exterior of the casing.

The upper casing 1 is provided with a sound hole 11 for guiding voice produced from the receiver 5 to the outside of the housing, key holes 13 into which protrusions 12 of the key sheet 7 are inserted and the number of which is the same as that of the protrusions 12, an opening 14 which is equal in size to the liquid crystal display portion 6, and so on. This opening 14 is covered with a transparent window 15 so that a user can recognize and read the characters, symbols, etc. displayed on the liquid crystal display portion 6.

An oscillator (VCO) for controlling an oscillation frequency by a voltage, a plurality of resistors, capacitors, and so on are mounted on the back surface of the main-body printed board 9 so that a receiving circuit portion 16 is constituted by a low-noise amplifier, a first mixer and so on. In addition, a temperature-compensated crystal oscillator (TCXO) for controlling a frequency stably, a plurality of resistors, capacitors, and so on are mounted through front-mount technique on the rear surface of the main-body printed board 9 so that a radio circuit portion 17 is formed. These receiving circuit portion 16 and radio circuit portion 17 are covered with a resin shielding case 18 for preventing electromagnetic waves from invading them from the outside.

The shielding case 18 is formed of resin material such as acrylonitrile butadiene styrene (ABS) or the like. The surface of the shielding case 18 is subjected to electroless copper plating so that electromagnetic waves can be prevented from passing through the shielding case 18, and the surface is further subjected to electroless nickel plating so that anti-corrosive treatment is given to the electroless copper plating.

Figure 2:
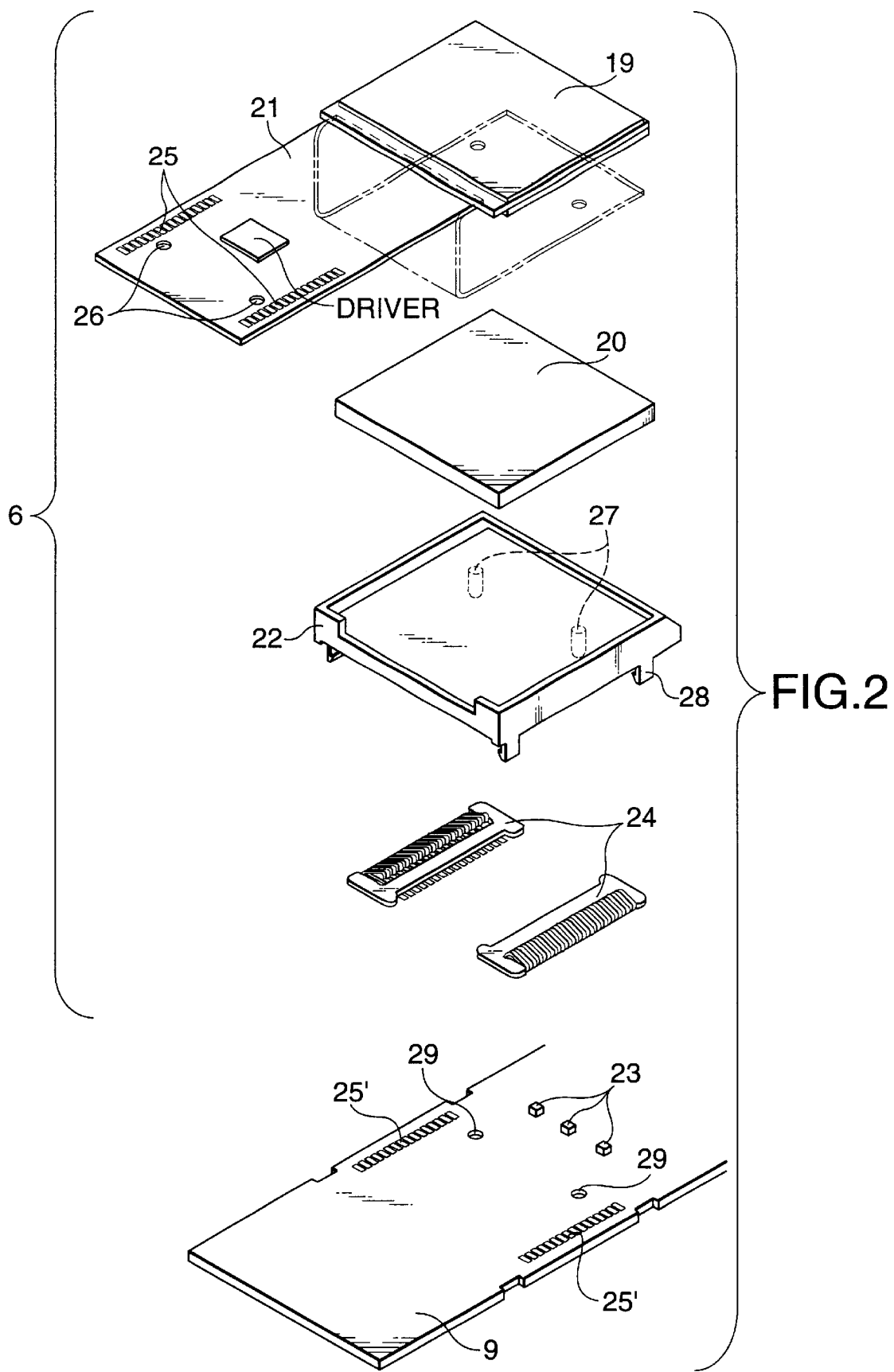
FIG. 2 is an exploded view showing the configuration of a liquid crystal display portion according to the embodiment of the present invention.

Next, detailed description will be made about the configuration of the liquid crystal display portion 6. FIG. 2 is a view showing a form of the liquid crystal display portion in the embodiment of the present invention, and FIG. 3 is a locally longitudinally sectional view of the liquid crystal display portion.

Figure 3:
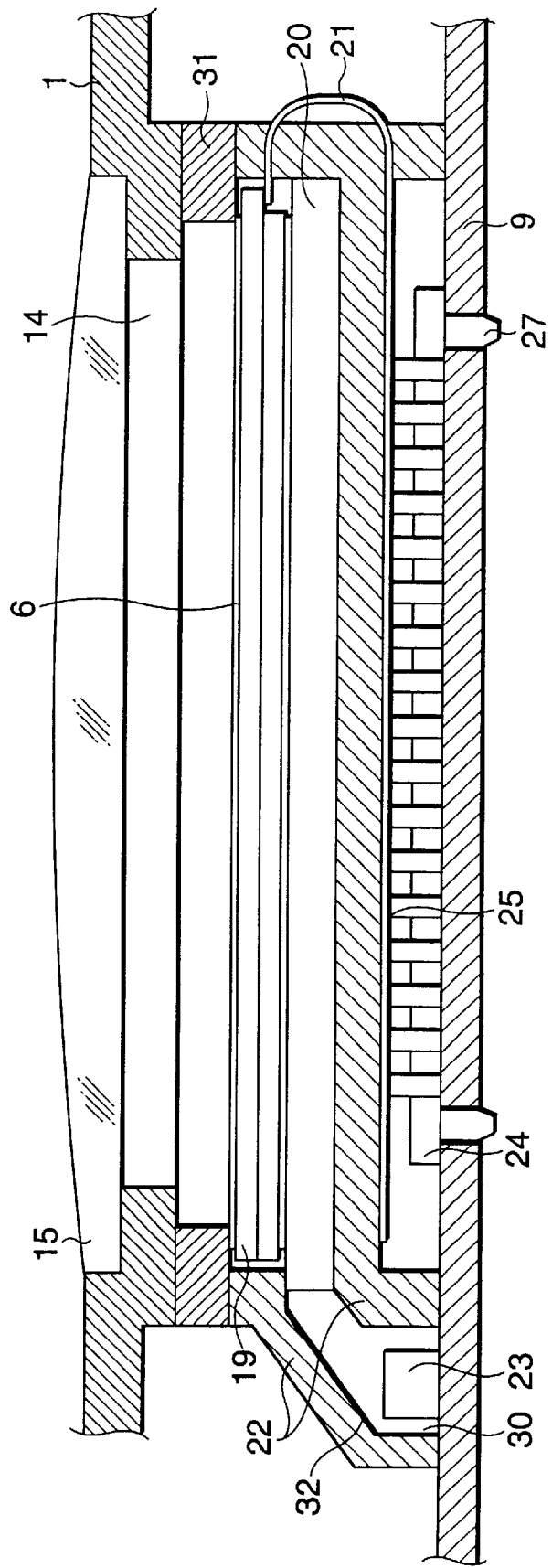
FIG. 3 is a locally longitudinally sectional view of the liquid crystal display portion.

In FIGS. 2 and 3, the liquid crystal display portion 6 is constituted by: a holding member 22 for holding a liquid crystal display 19, a light guide 20 and a flexible substrate 21; light-emitting element bodies 23; and spring bodies 24 in which a conductive spring is molded with resin, and mounted on the printed board 9.

The liquid crystal display 19 is configured so that liquid crystal display elements and transparent electrodes are sealed between two glass plates. One of the glass plates of the liquid crystal display 19 is formed to be slightly longer than the other glass plate, and the sealed transparent electrodes and the flexible substrate 21 are connected to the extension portion of the other glass plate by a conductive bonding agent. The flexible substrate 21 has a substantially rectangular shape. A terminal portion electrically connected to the above-mentioned transparent electrodes formed to be exposed is formed on one side of the flexible substrate 21. A driver connected to this terminal portion so as to drive the liquid crystal display is mounted on a central portion of the flexible substrate 21. Contact portions 25 electrically connected to this driver and exposed on the surface of the flexible substrate 21 are formed bilaterally evenly. In addition, two positioning through holes 26 are provided on the opposite side to the terminal portion.

The light guide 20 is a milky transparent plate formed of resin, and one or both sides thereof are roughened. The holding member 22 is formed of white resin. The light guide 20 is mounted on the front surface of the holding member. On the light guide 20, the flexible support 21 connected to the liquid crystal display 19 projects from the portion where the flexible support 21 is connected to the transparent electrode of the liquid crystal display 19 by a conductive bonding agent or the like in advance. Further, the flexible support 21 is folded, like a U-shape, and extends to the back of the holding member 20.

The two positioning through holes 26 provided on the forward end side of the flexible substrate 21 are respectively fitted to two positioning bosses 27 provided erectly on the back side of the holding member 22, so that the flexible substrate 21 is positioned. Thus, the contact portions 25 of the flexible substrate 21 are made to face the spring bodies 24 mounted on the printed board 9. That is, the contact portions 25 provided on the flexible substrate 21 are disposed bilaterally evenly on the lateral sides of the flexible substrate 21, and the spring bodies 24 corresponding to the contact portions 25 are also disposed bilaterally evenly.

In each of the light-emitting element bodies 23, a first light-emitting element (The light-emitting element may be referred to as "light-emitting diode", and so forth), a second light-emitting element, and a third light-emitting element are provided, so that they are integrated with resin. The first, second and third light-emitting elements have first, second and third wave lengths respectively, when a current is supplied thereto. These three light-emitting element bodies 23 are mounted on the printed board 9 at an interval pitch L along the side of the liquid crystal display 19 opposite to the side where the flexible substrate 21 is connected to the transparent electrodes so that the first to third light-emitting elements are arranged in the order toward the right side of the apparatus body. All the light-emitting elements of the light-emitting element bodies 23 emit light upward.

Next, the holding member 22 in which the liquid crystal display 19 and so on are incorporated and held as described above is installed so that hooks 28 of the holding member 22 are fitted in predetermined positions of the printed board 9, that is, in recess portions provided in the longitudinal sides of the printed board 9, while the above-mentioned positioning bosses 27 of the holding member 22 are inserted into the positioning holes 29 provided in the printed board 9. As a result, energized portions of the spring bodies 24 and the contact portions 25 of the flexible substrate 21 folded back to the back side of the holding member 22 in which the liquid crystal display 19 and soon are incorporated and held are energized by the spring force.

The light-emitting element bodies 23 are received in a light-emitting element body receiving portion 30 formed on the back side of the holding member 22. The circumference of the light-emitting element body receiving portion 30 enclosing the light-emitting element bodies 23 abut against the printed board 9 so that light emitted from the light-emitting element bodies 23 can be prevented from leaking from a gap between the light-emitting element body receiving portion 30 and the printed board 9 to the outside.

The liquid crystal display portion 6 attached to the printed board 9 is received in a casing. The casing is provided with an opening portion 14 through which characters, symbols, figures and so on displayed on the liquid crystal display 19 can be seen from the outside. This opening portion 14 is further covered with a transparent window 15. A closed-U-shaped cushion 31 is provided between the liquid crystal display portion 6 and the upper casing 1 so as to prevent dust or the like from invading the liquid crystal display portion 6 from the outside.

Next, detailed description will be made about the configuration for illuminating the liquid crystal display portion 6. In FIG. 3, light emitted from the light-emitting element body 23 is reflected on the wall surfaces of the holding member 22 forming the light-emitting element body receiving portion 30, or reflected on a slope 32 above the light-emitting element body receiving portion 30 and then enters the light guide 20. The light entering the light guide 20 is guided to the whole of the light guide.

Thus, the whole area of the light guide 20 becomes bright so that symbols, characters, figures, etc. displayed on the liquid crystal display 19, or the vicinities thereof are illuminated from the back. As a result, the displayed symbols, characters, figures, etc. become easy to be seen clearly from the front through the transparent window 15.

Figure 4:
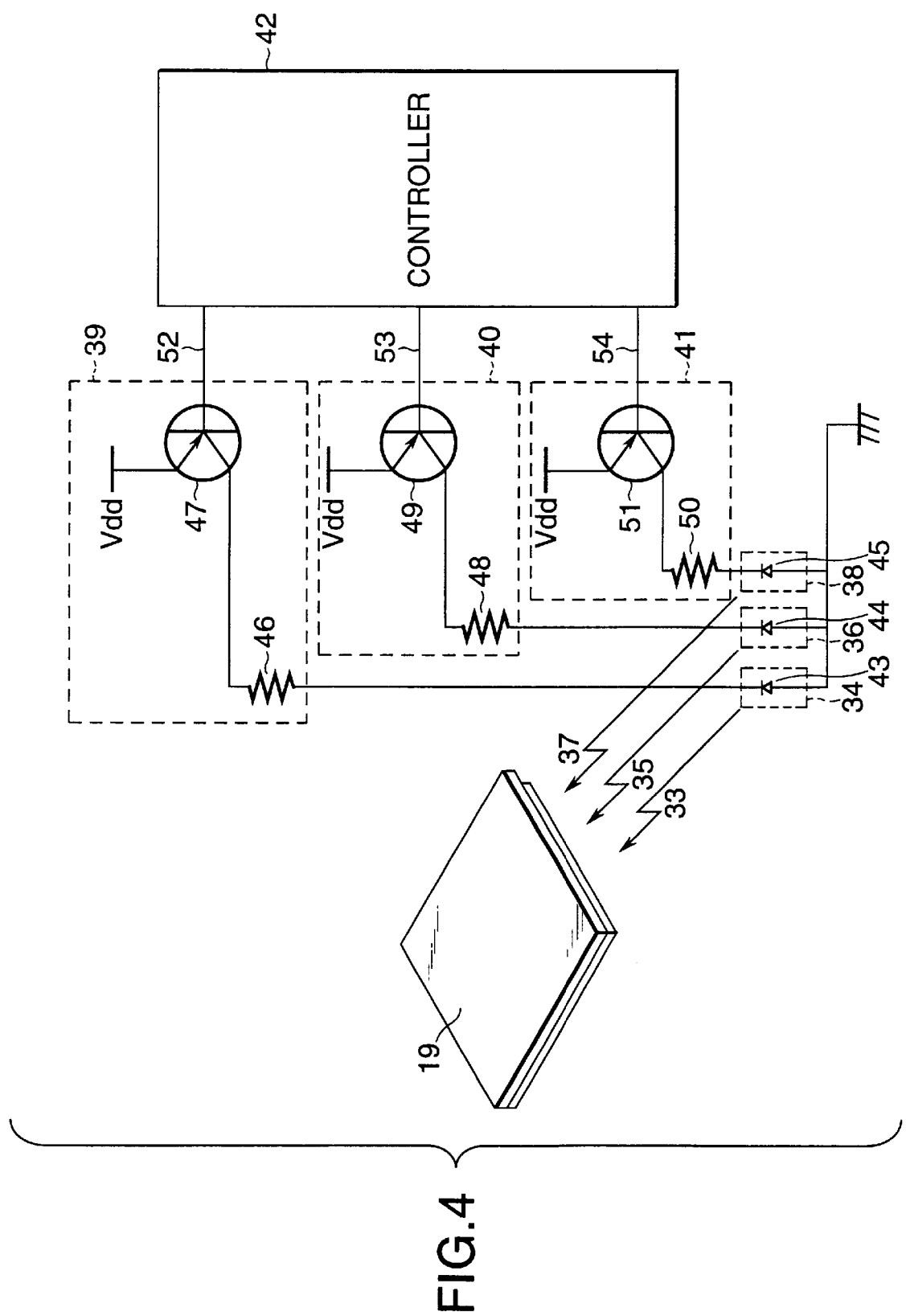
FIG. 4 is a circuit diagram showing a configuration of a portable telephone according to the embodiment of the present invention.

Next, description will be made about the circuit. FIG. 4 is a diagram showing a circuit configuration for illuminating the liquid crystal display portion 6 of the portable telephone according to the embodiment of the present invention. In FIG. 4, the circuit includes: a liquid crystal display 19 for displaying characters, figures, symbols, etc.; a first light-emitting means 34 for outputting illumination light 33 of a first wave length as means for illuminating the liquid crystal display 19; a second light-emitting means 36 for outputting illumination light 35 of a second wave length as means for illuminating the liquid crystal display 19; a third light-emitting means 38 for outputting illumination light 37 of a third wave length as means for illuminating the liquid crystal display 19; a first driving means 39 for driving the first light-emitting means 34; a second driving means 40 for driving the second light-emitting means 36; a third driving means 41 for driving the third light-emitting means 38; and a control means 42 for controlling the first to third driving means 39 to 41.

Further, the first light-emitting means 34 is constituted by a first light-emitting element 43 for emitting the illumination light 33 of the first wave length. The second light-emitting means 36 is constituted by a second light-emitting element 44 for emitting the illumination light 35 of the second wave length. The third light-emitting means 38 is constituted by a third light-emitting element 45 for emitting the illumination light 37 of the third wave length. The first driving means 39 is constituted by a first resistor 46 for limiting a current to the first light-emitting element 43, and a first transistor 47 for performing application/break of driving voltage. The second driving means 40 is constituted by a second resistor 48 for limiting a current to the second light-emitting element 44, and a second transistor 49 for performing application/break of driving voltage. The third driving means 41 is constituted by a third resistor 50 for limiting a current to the third light-emitting element 45, and a third transistor 51 for performing application/break of driving voltage.

First to third control signals 52 to 54 for controlling the first to third transistors 47, 49 and 51 respectively are produced from the control means 42.

Next, description will be made about the operation of the circuit. The control means 42 makes the first control signal 52 active when the portable telephone is in a first operation state. As a result, the first transistor 47 of the first driving means is turned on so as to apply voltage to the first light-emitting element 43. This first light-emitting element 43 emits the illumination light 33 of the first wave length. The light in color having the first wave length is guided to the light guide so as to illuminate the liquid crystal display 19 from its back.

Further, the control means 42 makes the second control signal 53 active when the portable telephone is in a second operation state. As a result, the second transistor 49 of the second driving means is turned on so as to apply voltage to the second light-emitting element 44. This second light-emitting element 44 emits the illumination light 35 of the second wave length. The light in color having the second wave length is guided to the light guide so as to illuminate the liquid crystal display 19 from its back.

Further, the control means 42 makes the third control signal 54 active when the portable telephone is in a third operation state. As a result, the third transistor 51 of the third driving means is turned on so as to apply voltage to the third light-emitting element 45. This third light-emitting element 45 emits the illumination light 37 of the third wave length. The light in color having the third wave length is guided to the light guide so as to illuminate the liquid crystal display 19 from its back.

Further, the control means 42 makes the first and second control signals 52 and 53 active when the portable telephone is in a fourth operation state. As a result, the transistors 47 and 49 of the first and second driving means are turned on so as to apply voltage to the first and second light-emitting elements 43 and 44. The first and second light-emitting elements 43 and 44 emit the illumination lights 33 and 35 of the first and second wave lengths respectively. The lights in colors having the first and second wave lengths are guided to the light guide so as to illuminate the liquid crystal display 19 from its back.

Further, the control means 42 makes the first and third control signals 52 and 54 active when the portable telephone is in a fifth operation state. As a result, the transistors 47 and 51 of the first and third driving means are turned on so as to apply voltage to the first and third light-emitting elements 43 and 45. The first and third light-emitting elements 43 and 45 emit the illumination lights 33 and 37 of the first and third wave lengths respectively. The lights in colors having the first and third wave lengths are guided to the light guide so as to illuminate the liquid crystal display 19 from its back.

Further, the control means 42 makes the second and third control signals 53 and 54 active when the portable telephone is in a sixth operation state. As a result, the transistors 49 and 51 of the second and third driving means are turned on so as to apply voltage to the second and third light-emitting elements 43 and 45. The second and third light-emitting elements 44 and 45 emit the illumination lights 35 and 37 of the second and third wave lengths respectively. The lights in colors having the second and third wave lengths are guided to the light guide so as to illuminate the liquid crystal display 19 from its back.

Further, the control means 42 makes the first to third control signals 52 to 54 active when the portable telephone is in a seventh operation state. As a result, the transistors 47, 49 and 51 of the first to third driving means are turned on so as to apply voltage to the first to third light-emitting elements 43 to 45. The first to third light-emitting elements 43 to 45 emit the illumination lights 33, 35 and 37 of the first to third wave lengths respectively. The lights in colors having the first to third wave lengths are guided to the light guide so as to illuminate the liquid crystal display 19 from its back.

That is, the light guide is illuminated with the color of the first wave length when the portable telephone is in the first operation state, and the light guide is illuminated with the color of the second wave length when the portable telephone is in the second operation state. In such a manner, when three kinds of light-emitting elements are provided to emit lights of different wave lengths respectively, the liquid crystal display can be illuminated with seven kinds of colors in total, that is, three kinds of colors having the same wave lengths as those of the colors of the emitted lights, and four kinds of combined colors.

The above description can be expressed in the following table.

TABLE 1

|  | First (R) | second (G) | third (B) |
|---|---|---|---|
| First (R) | ○ | — | — |
| Second (G) | ○ | ○ | — |
| Third (B) | ○ | ○ | ○ |

The above table is a matrix showing the color of illumination light. Six kinds of colors can be formed by respective combinations of the light emitting elements in such a manner that one color is formed by the first and second light-emitting elements, and another color is formed by the first and third light-emitting elements, and so forth. One kind of color is further formed by turning on all the light-emitting elements. As a result, the liquid crystal display can be illuminated with seven colors.

Next, description will be made about a method for arranging the light-emitting element bodies.

Figure 5:
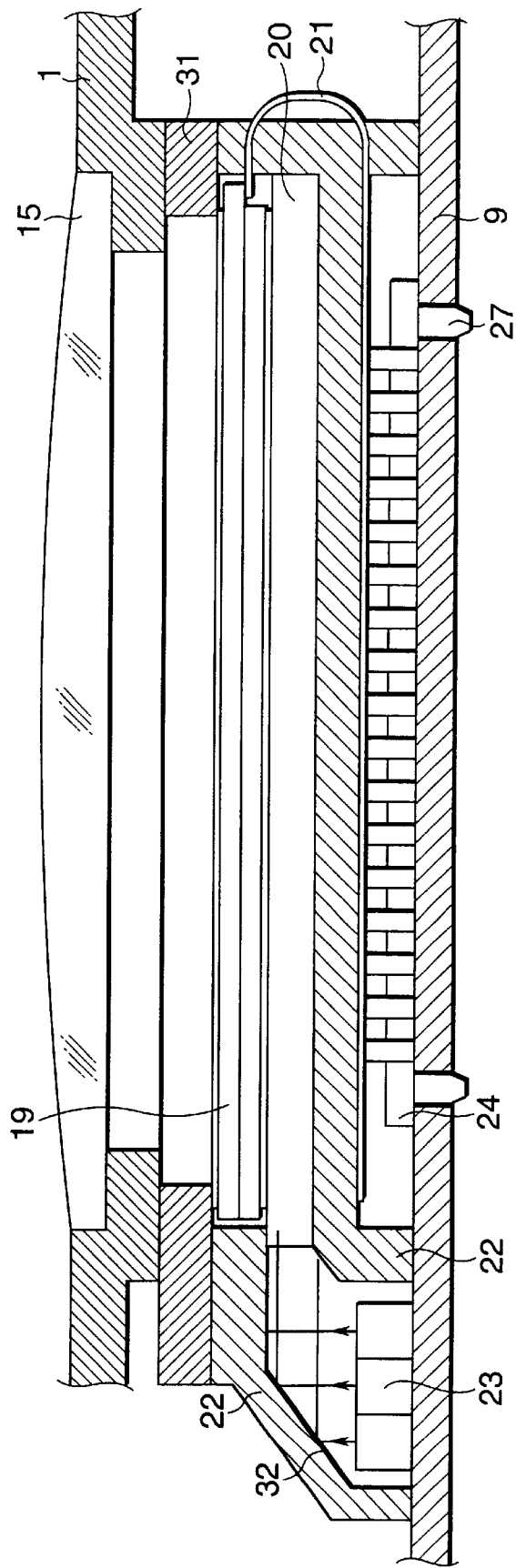
FIG. 5 is a longitudinally sectional view of the liquid crystal display portion when a light-emitting element body is turned to the liquid crystal display.

FIG. 5 is a longitudinally sectional view of the liquid crystal display portion 6 when the light-emitting element body 23 is turned to the liquid crystal display 19. In this case, the following problems occur.

First, the distance between the opposite side walls of the holding member 22 forming the light-emitting element body receiving portion 30 must be made long so that the light-emitting element body 23 in which the first to third light-emitting elements 43 to 45 are formed integrally as shown in FIG. 4 is received in the light-emitting element body receiving portion 30. As a result, the holding member 22 becomes large so that the size of the apparatus increases.

Secondly, the holding member 22 is provided with the slope 32 in order to guide light emitted from the light-emitting element body 23 to the whole of the light guide 20, that is, the light is diffused to the whole of the light guide 20 by the reflection of light on this slope 32. In such a configuration, however, in order that all the lights emitted from the light-emitting elements 43 to 45 are reflected on this slope 32 so as to uniformly illuminate the whole of the light guide 20, not the lights are emitted just upward from the light-emitting elements 43 to 45 respectively, but the lights must be emitted so as to be reflected on the slope 32 to enter the light guide 20. It is therefore necessary to use means for making the angles of emission of light from the light-emitting elements 43 to 45 differently from one another.

Although, for example, the second and third light-emitting elements 44 and 45 may be therefore inclined with respect to the first light-emitting element 43 in the light-emitting element body 23, the centroid of the light-emitting element body 23 moves from the center to an upper or end portion of the element body 23 in the case where the second and third light-emitting elements 44 and 45 are raised upward to some extent so that the light-emitting element body 23 is tilted right upward. That is, the light-emitting element body 23 has a mass eccentricity. In this case, when such a light-emitting element body 23 the centroid of which is eccentric is mounted on a printed board by ref lowing, there may be a case where the light-emitting element body 23 falls down after being transferred and disposed on the printed board from a reel or the like. In addition, when the external shape of the light-emitting element body 23 becomes complicated, it is difficult to be sucked and chucked by a robot when the light-emitting element body is transferred. Accordingly, the light-emitting element body 23 becomes unsuitable for reflow soldering, so that the productivity deteriorates and the cost occasionally increases.

Thirdly, in the light-emitting element body 23 formed to be flat as shown in FIG. 5, illumination light emitted from the first light-emitting element 43 disposed on the left side is reflected on the slope 32, and then made to enter the light guide so as to be diffused to the whole of the light guide. However, the light emitted from each of the second and third light-emitting elements 44 and 45 cannot be guided into the light guide 20 because it is incident to the slope at an incident angle which is different from that of the first illumination light or it cannot be incident to the slope. Even if the slope 32 is therefore formed to be gentle so that all the illumination lights emitted from the light-emitting elements 43 to 45 can be reflected on this slope 32, the incident angles of the lights to the slope from the respective light-emitting elements are different from one another. As a result, there arises a problem that the whole of the light guide is not illuminated uniformly.

Accordingly, light-emitting element bodies in each of which a plurality of light-emitting elements are formed integrally are arranged along one side of a liquid crystal display so that light emitted from any light-emitting element is made incident to and reflected on one and the same slope. In such a manner that the same light guide means is applied to any light-emitting element, it is possible to eliminate unevenness in brightness in the illuminated portions. Thus, it is possible to solve all the problems described above.

Next, description will be made about the case where light-emitting element bodies are arranged along one side of a liquid crystal display according to an embodiment of the present invention, with reference to FIGS. 6 and 7.

Figure 6A:
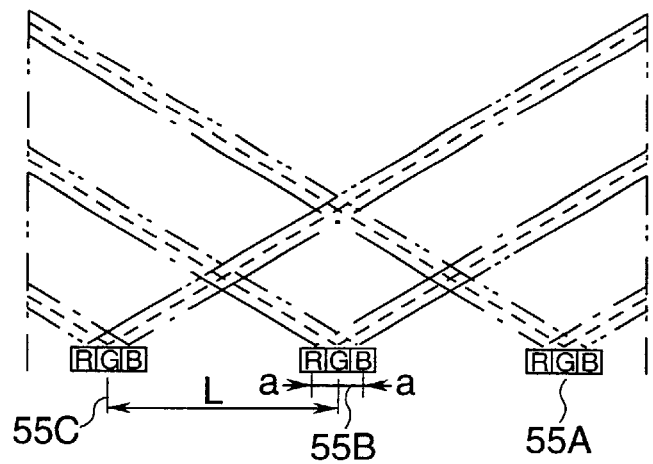
FIG. 6A is a view of light paths of lights emitted from light-emitting element bodies.
Figure 7A:
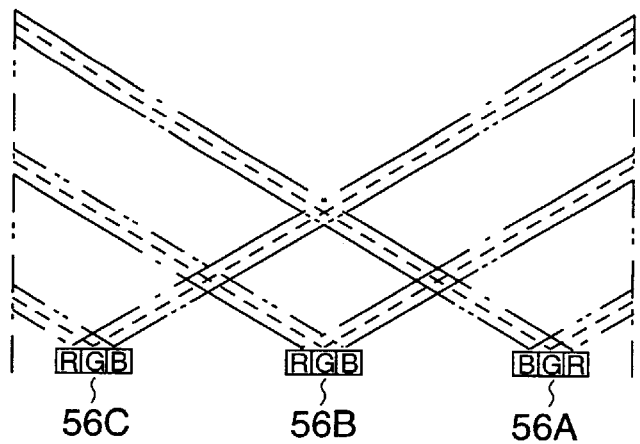
FIG. 7A is a view of light paths when only two light-emitting element bodies are made to face each other.

FIG. 6A is a view of light paths of lights emitted from light-emitting element bodies in this embodiment of the present invention, and FIG. 7A is a view of light paths when only two light-emitting element bodies in FIG. 6A are made opposite to each other (light-emitting element bodies disposed at the right end and at the center are made opposite to each other).

In FIG. 6A, light-emitting element bodies 55A, 55B and 55C are disposed at equal intervals in the same direction. In each light-emitting element body, a right light-emitting element for emitting blue light of a wave length in a range of from 400 nm to 500 nm (B in the drawing), a central light-emitting element for emitting green light of a wave length in a range of from 500 nm to 600 nm (G in the drawing), and a left light-emitting element for emitting red light of a wave length in a range of from 600 nm to 700 nm (R in the drawing) are formed integrally in the order of B, G and R from the right to the left. Then, let the pitch of the light-emitting elements be a, and the pitch of the light-emitting element bodies be L. Specifically, the wave lengths of the light-emitting elements used for emitting blue light (B in the drawing), green light (G in the drawing) and red light (R in the drawing) are 470 nm, 520 nm and 610 nm respectively. The order of arrangement of the light-emitting elements B, G and R is not always limited to the aforementioned order.

It is assumed that light-emitting element bodies in FIG. 7A are designated by the reference numerals 56A, 56B and 56C respectively, and the pitch of the light-emitting elements and the pitch of the light-emitting element bodies are equal to those in FIG. 6A.

Here, description will be made about examples of light emission with reference to FIGS. 6 and 7.

(First Example of Light Emission)

Figure 6B:
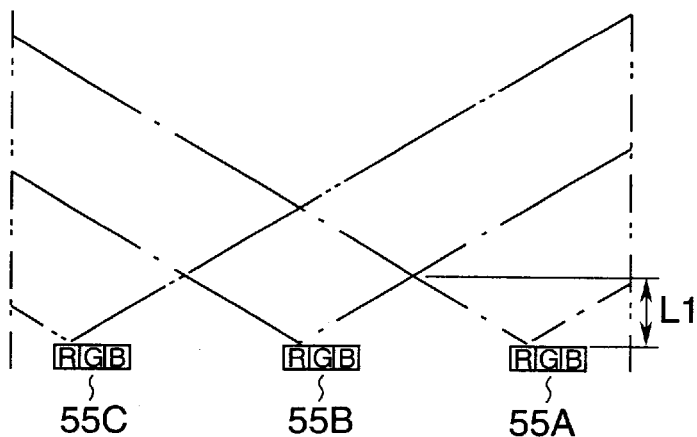
FIG. 6B is a view of light paths when a light-emitting element R of a right light-emitting element body 55A emits light in the above view FIG. 6A.
Figure 7B:
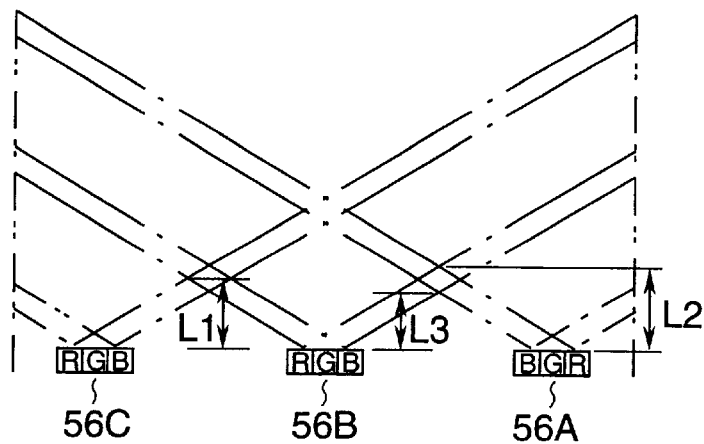
FIG. 7B is a view of light paths when a light-emitting element R of a right light-emitting element body 56A emits light in the above view FIG. 7A.

Detailed description will be made about the case where lights of the same wave length are emitted from a plurality of light-emitting elements. FIGS. 6B and 7B show light paths when the light-emitting elements R of the right light-emitting element bodies 55A and 56A in FIGS. 6A and 7A respectively emit light.

In FIG. 6B, light emitted from the light-emitting element R of the light-emitting element body 55B disposed at the center, and lights emitted from the light-emitting elements R of the light-emitting element bodies 55A and 55C, respectively, adjacent to the light-emitting element body 55B form a combined color at a distance L1 from the light-emitting element body 55B. The distance L1 is expressed by the following expression (1).

$$L1 = (L/2)/\tan(\psi/2) \tag{1}$$

In addition, the light-emitting element G or B of the light-emitting element body 55B, and the light-emitting elements G or B of the light-emitting element bodies 55A and 55C, respectively, adjacent to the light-emitting element body 55B form a combined color at the distance L1 in the same manner as described above.

On the other hand, in FIG. 7(b), although lights emitted from the light-emitting elements B, G or R of the light-emitting element bodies 56B and 56C disposed at the center and at the left end are combined at the distance L1, the lights emitted from the light-emitting elements R of the light-emitting element bodies 56A and 56B are combined at a distance L2. This is because the light-emitting element R of the light-emitting element body 56A disposed at the right end is disposed on the right side of the apparatus body, while the light-emitting element R of the light-emitting element body 56B is disposed on the left side thereof. The distance L2 is expressed by the following expression (2)

$$L2 = \{(2a+L)/2\}/\tan(\psi/2) \tag{2}$$

Here, comparing distances from the light-emitting elements R as light sources to the light-combined points in FIGS. 6(b) and 7(b) with each other, the distance in FIG. 7(b) becomes longer by ΔL (=L2−L1). Here, ΔL is expressed by the following expression (3).

$$\Delta L = 2a \tan(\psi/2) \tag{3}$$

Here, when a user see not-combined light, the user feels the light darker or lighter than the light in a combined portion, or senses that the color of the light is uneven. It is therefore necessary to set a visible range of the user to places father than this combined point. Further, even if the above-mentioned visible range is set to places farther than this combined point, the combined color formed by the lights from the light-emitting elements R of the light-emitting element bodies 56A and 56B disposed at the right end and at the center is felt paler by the user because light becomes darker in inverse proportion to the square of the distance from a light source. That is, light in the end side looks dark. Therefore, characters, symbols and so on displayed on the right side of the liquid crystal display cannot be seen clearly though those displayed at the center or on the left side of the same display can be seen clearly.

On the other hand, the lights emitted from the light-emitting elements B of the light-emitting element bodies 56A and 56B disposed at the right end and at the center respectively are combined at a distance L3. The distance L3 is expressed by the following expression (4).

$$L3=\{(-2a+L)/2\}/\tan(\psi/2) \qquad (4)$$

Here, comparing the distances from the light-emitting elements B as light sources to the light-combined points in FIGS. 6B and 7B with each other, the distance in FIG. 6B becomes shorter by $\Delta L$ ($=L1-L3=L2-L1$).

Thus, the light in the right side looks light unlike the above-mentioned case. Therefore, characters, symbols and so on displayed on the right side of the liquid crystal display cannot be seen clearly though ones displayed at the center or on the left side can be seen clearly. That is, such a case occurs because the brightness is different between the left side and right side in a scene.

(Second Example of Light Emission)

Figure 6C:
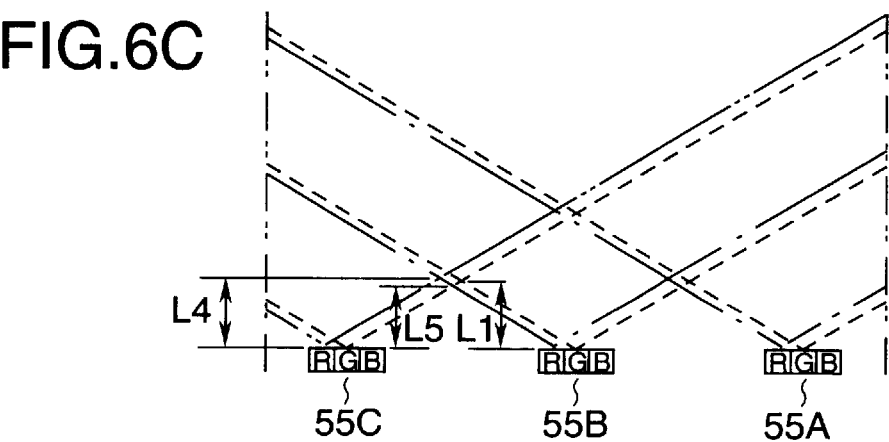
FIG. 6C is a view of light paths when light-emitting elements R and G of respective light-emitting element bodies emit lights in the above view FIG. 6A.
Figure 7C:
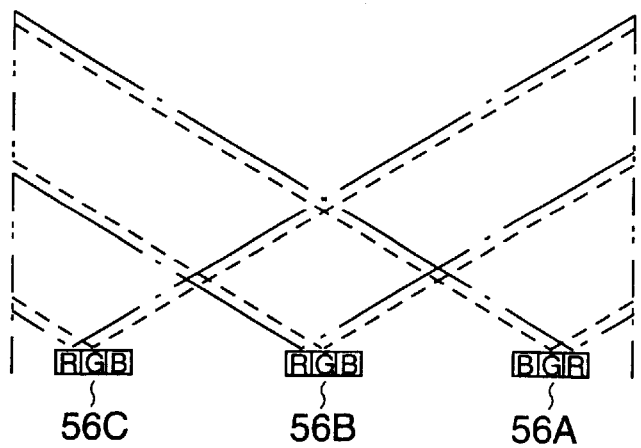
FIG. 7C is a view of light paths when light-emitting elements R and G of respective light-emitting element bodies emit lights in the above view FIG. 7A.

Detailed description will be made about the case where lights of a plurality of wave lengths are emitted from a plurality of light-emitting elements respectively. FIGS. 6C and 7C show light paths when the light-emitting elements R and G in each of the light-emitting element bodies in FIGS. 6A and 7A emit light.

In FIG. 6C, the lights emitted from the light-emitting elements R or G of the light-emitting element bodies 55A and 55B, or 55B and 55C adjacently to each other are combined at a distance L1 from the light-emitting elements R or G as light sources.

Next, for example, the light emitted from the light-emitting element R of the light-emitting element body 55C disposed at the left end, and the light emitted from the light-emitting element G of the light-emitting element body 55B disposed at the center are combined at a distance L4 from the light-emitting element R or G as a light source. The same situation applies to the case of the light-emitting element R of the light-emitting element body 55B disposed at the center, and the light-emitting element G of the light-emitting element body 55A disposed at the right end. The point L4 is expressed by the following expression (5).

$$L4=\{(a+L)/2\}/\tan(\psi/2) \qquad (5)$$

On the other hand, the light emitted from the light-emitting element G of the light-emitting element body 55C disposed at the right end and the light emitted from the light-emitting element R of the light-emitting element body 55B disposed at the center are combined at a distance L5 from the light-emitting element bodies. The same situation applies to the case of the light-emitting element G of the light-emitting element body 55B disposed at the center, and the light-emitting element R of the light-emitting element body 55A disposed at the right end. The distance L5 is expressed by the following expression (6).

$$L5=\{(-a+L)/2\}/\tan(\psi/2) \qquad (6)$$

Since the distance L4 from the light source is longer than the distance L5 from the light source, and since the lights emitted from the four light-emitting elements G and R of the two adjacent light-emitting element bodies are combined at the combined point L4 or more distant point, uniform combined color is formed at this combined point L4 or more distant point.

The case of FIG. 7C differs from that of FIG. 6C in the combined point where a combined color is formed by the lights from the emitting-light elements of the light-emitting element bodies disposed at the center and at the right end respectively. Specifically, the light emitted from the light-emitting element R of the light-emitting element body 56B disposed at the center and the light emitted from the light-emitting element G of the light-emitting element body 56A disposed on the right side are combined at the combined point L4, and the light emitted from the light-emitting element G of the light-emitting element body 56B at the center and the light emitted from the light-emitting element R of the light-emitting element body 56A on the right are combined at the combined point L4.

Thus, the lights emitted from the light-emitting elements R and G of adjacent light-emitting element bodies are combined at the same distance L4. However, the lights from the both are combined not at this combined point L4 or a more distant point as shown in FIG. 6C, but combined at a more distant combined point L2.

That is, the lights from the light-emitting elements R and G of the light-emitting element bodies 56B and 56C at the center and at the left end are combined at the point L4 or more distant point, while the lights from the light-emitting elements R and G of the light-emitting element bodies 56B and 56A at the center and at the right end are combined at the point L2 or more distant point. This difference $\Delta L2$ ($=L2-L4$) is expressed by the following expression (7).

$$\Delta L2=(a/2)\tan(\psi/2) \qquad (7)$$

Therefore, any combined color is not formed on the right side of the liquid crystal display in comparison with the vicinities of the left side or the center thereof. Accordingly, although characters, symbols and so on displayed at the center or on the left side can be seen clearly, those displayed on the right side cannot be seen clearly because there is a difference in brightness or color between the left and right sides on the screen. Alternatively, in the case where the visible range is set to the point L4 or more distant point, a combined color is formed all over the area. However, there arises a phenomenon that light on the right side is darker than that on the left side or at the center because brightness is inversely proportional to the square of the distance as described above. Thus, this dark portion cannot be seen clearly.

(Third Example of Light Emission)

Description will be made about the case where all the light-emitting elements of all the light-emitting element bodies emit light. In FIG. 6(a), when all the light-emitting elements R, G and B of light-emitting element bodies 55C and 55B disposed at the left end and at the center or the light-emitting element bodies 55B and 55A disposed at the center and at the right end, the combined point among the light-emitting elements R, G and B of the adjacent light-emitting element bodies is the point L2.

Also in FIG. 7A, when all the light-emitting elements R, G and B of light-emitting element bodies 56C and 56B disposed at the left end and at the center or the light-emitting element bodies 56B and 56A disposed at the center and at the right end, the combined point among the light-emitting elements R, G and B of the adjacent light-emitting element bodies is the point L2.

However, the distance L2 where the lights emitted from the light-emitting elements R of the light-emitting element bodies 56A and 56B disposed at the right end and at the center are combined is longer than the distance L1 where the lights emitted from the light-emitting elements R of the light-emitting element bodies 56B and 56C disposed at the center end and at the left end are combined. Further, the distance L3 where the lights emitted from the light-emitting elements B of the light-emitting element bodies 56A and 56B at the right end and at the center are combined is shorter than the distance L1 where the lights emitted from the light-emitting elements B of the light-emitting element bodies 56B and 56C at the center end and at the left end are combined. It is therefore obvious that the color at the right side of the visible range is different from that at the center or at the left side thereof.

In order to solve unevenness in brightness and color shading caused by this difference of the length of the light path, there arises a problem that current consumption increases. For example, it is necessary to increase a current applied to the light-emitting element R of the light-emitting element body 56A disposed at the right end in comparison with the other light-emitting elements in order to increase the brightness of the light-emitting element R of the light-emitting element body 56A.

Therefore, the length of the light path can be made shortest by turning the light-emitting element bodies in the same direction in order to solve this problem. As a result, the thickness or the length of the casing can be reduced by shortening the length of the light path and the problems such as unevenness in brightness or color shading can be solved without increasing current consumption. Accordingly, there is an effect that the display portion can be illuminated with a plurality of colors without increasing the size of the portable telephone, and at the same time, the talk time or standby time is prevented from being shortened.

According to the embodiment of the present invention, as has been described, if light-emitting element bodies for emitting lights different in wave length are disposed to face in the same direction, the distance to a combined point can be shortened even in various patterns of light emission in comparison with the case where at least one light-emitting element body is disposed in a different direction. It is therefore possible to miniaturize the apparatus. In addition, all the combined points among lights from the light-emitting elements R, G and B can be made the same, so that it becomes easy to read displayed characters or symbols clearly without unevenness in brightness or color shading within a display area of a display.

Further, the intensity of light for illuminating the display can be changed if a current applied into each light-emitting element is controlled in order to adjust and vary the amount of light emitted from the light-emitting element. In this case, the size of resistor connected in series to the light-emitting element body may be changed, or a current applied to the light-emitting element body may be varied. Even under such a variation, the above-mentioned color shading or shade/light of light within a visible range can be avoided if the light-emitting element bodies are arranged in the same direction. Accordingly, the liquid crystal display can display clear characters, symbols, etc. which are visually recognized by a user.

Further, although the embodiment of the present invention showed an example of use of light-emitting element bodies in each of which first to third light-emitting elements were integrated, these first to third light-emitting elements are not always integrated. In this case, it will go well if a plurality of light-emitting element groups in each of which first to third light-emitting elements are disposed concentrically are formed at short intervals along one side of a liquid crystal display so as to face in one and the same direction. Then, in this case, an effect similar to that in this third embodiment can be obtained, for example, if the interval a between the light-emitting elements which corresponds to the light-emitting element interval in this third embodiment, and the interval between the light-emitting element groups which corresponds to the interval L between the light-emitting element bodies are set so that the interval L is made longer than the interval a.

In this case, there are advantages in the case of the light-emitting element bodies. First, parts to be mounted on a printed board are subjected to front-mount by a mounting machine. Then, the size and capacity of the mounting machine depend on the number of the parts. For example, when 100 kinds of electronic parts are to be mounted on one side of a printed board, two mounting machines each capable of mounting 50 kinds of parts may be used, or one mounting machine capable of mounting 100 kinds of parts may be used. Here, in the case of the light-emitting element bodies, the number of kinds of parts is smaller by two than that in the case of the light-emitting element groups, so that the number of kinds of parts can be reduced by two. In the case of the light-emitting element groups, on the contrary, the number of kinds of parts is larger by two, so that sometimes three mounting machines each capable of 50 kinds of parts or two mounting machines each capable of 100 kinds of parts must be prepared. Thus, there is a problem that serious influence is given to the equipment. Therefore, it is preferable that the number of kinds of parts is smaller. Thus, since the number of parts is smaller in the case of the light-emitting element bodies than in the case of the light-emitting element groups, the restriction on the mounting machines and equipment can be reduced in the former case so that it is preferable for reflow mounting.

Moreover, such parts are supplied by a reel, and if any reel becomes empty, the emptied reel is exchanged for a unused reel to continue mounting. Then, in the case of the light-emitting element body, it is sufficient, only one reel is exchanged, while three reels must be exchanged in the case of the light-emitting element group. Accordingly, in the case of the light-emitting element group, the time of exchanging reels can be shortened into ⅓, so that it is possible to improve the efficiency in mounting.

Further, although description was made about the case where three light-emitting element bodies were provided in this third embodiment, the same effect can be obtained in the case where two or four light-emitting element bodies are provided.

Even in the case where two light-emitting element bodies are provided, if they are disposed to face in one and the same direction, the combined points of the lights emitted from all the light-emitting elements can be set with a shortest distance from the elements. In this case, as described in the above first example of light emission, unevenness in brightness can be eliminated, and the size of the apparatus is prevented from increasing. Then, the two light-emitting element bodies may be arranged in the same direction substantially symmetrically with respect to the center of the liquid crystal display. That is, in the case of two light-emitting element bodies, they may be disposed substantially symmetrically with respect to the center of the liquid crystal display, and in the case of three or more light-emitting element bodies, they may be disposed in one and the same direction at equal intervals.

In addition, according to this embodiment, it is possible to solve such a problem to eliminate unevenness in brightness or color shading without increase of current consumption, and, at the same time, it is possible to illuminate a liquid crystal display portion with many kinds of light colors. Accordingly, if the present invention is applied to an apparatus supplied with electric power by a battery having a limited capacity, such as a portable information apparatus, the use time from full charge of the battery to complete discharge thereof is prevented from being shortened so that the continuous use time is prolonged. Accordingly, the present invention is suitable for such an apparatus.

As described above, according to the invention, the illuminator comprises: a printed board; a plurality of light-emitting element groups, each of the groups being mounted on the printed board and constituted by a plurality of light-emitting elements different in wave length and disposed at predetermined intervals; light guide means using the light-emitting element groups as light sources and guiding lights from the light-emitting element groups onto a predetermined surface; and a substantially rectangular liquid crystal display for displaying characters, symbols, figures, etc. while being illuminated by the light guide means; the light-emitting element groups being disposed at intervals along one side of the rectangular liquid crystal display.

With this configuration, the invention has such an effect that a combined point where light emitted from one light-emitting element and light emitted from another light-emitting element are combined can be made shortest from the light-emitting elements. Accordingly, there is an effect that color shading or unevenness in brightness of the illumination light can be eliminated so that characters, symbols, etc. displayed on the display can be read clearly.

Further, according to the invention, the illuminator comprises: a printed board; light-emitting element bodies, each of the bodies being mounted on the printed board and constituted by a plurality of light-emitting elements differer it in wave length and provided integrally with each other; light guide means using the light-emitting element bodies as light sources and guiding lights from the light-emitting element bodies onto a predetermined surface; and a substantially rectangular liquid crystal display for displaying characters, symbols, figures, etc. while being illuminated by the light guide means; the light-emitting element bodies being disposed at intervals along one side of the rectangular liquid crystal display. With this configuration, the invention has such an effect that a combined point where light emitted from one light-emitting element and light emitted from another light-emitting element are combined can be set to be closest from the light-emitting elements. Further, the number of parts can be reduced. Accordingly, there is an effect that color shading or unevenness in brightness of the illumination light can be eliminated so that characters, symbols, etc. displayed on the display can be read clearly. Further, there is an effect that increase of the size of an apparatus provided with such an illuminator can be avoided. In addition, the restriction on mounting machines and equipment can be reduced.

Further, according to the invention, the illuminator comprises: a printed board; light-emitting element bodies, each of the bodies being mounted on the printed board and constituted by a plurality of light-emitting elements different in wave length and provided integrally with each other; light guide means using the light-emitting element bodies as light sources and guiding lights from the light-emitting element bodies onto a predetermined surface; and a substantially rectangular liquid crystal display for displaying characters, symbols, figures, etc. while being illuminated by the light guide means; the light-emitting element bodies being three or more and disposed at intervals along one side of the rectangular liquid crystal display. With this configuration, the invention has such an effect that color shading and unevenness in brightness are eliminated all over the display area, characters, symbols, figures, etc. displayed on the display are made to be readable clearly, and the size of apparatus provided with such an illuminator can be prevented from increasing.

Further, according to the invention, the light-emitting elements can emit light simultaneously. With this configuration, the invention has such an effect that characters, symbols, figures, etc. displayed on the display are made to be readable clearly even if those characters, symbols, figures, etc. are illuminated with larger number of kinds of light than the number of kinds of light-emitting elements, and the size of apparatus provided with such an illuminator can be prevented from increasing.

Further, according to the invention, currents flowing into the light emitting elements are controlled to thereby change the intensity of illumination light. With this configuration, the invention has such an effect that a combined point of lights is fixed so that the display area can be illuminated uniformly with innumerable number of kinds of light without causing any color shading or unevenness in brightness In addition, the present invention is suitable for a portable information apparatus provided with the illuminator described above in detail. That is, since a battery for supplying electric power to the apparatus has a limited capacity, there is an effect that the time from full charge of the battery to complete discharge thereof, that is, the use time of the battery can be prevented from being shortened. Therefore, the present invention is suitable for such an apparatus.

What is claimed is:

1. An illuminator comprising:

a printed board;

a plurality of light-emitting groups, each light-emitting group being mounted on the printed board and constituted by a plurality of light-emitting elements which are different in wave length and disposed at predetermined intervals;

light guide means guiding lights from said light-emitting element groups onto a predetermined surface; and a substantially rectangular liquid crystal display for displaying while being illuminated by said light guide means;

wherein said light-emitting element groups being disposed at intervals along one side of said rectangular liquid crystal display.

2. An illuminator comprising:

a printed board;

light-emitting element bodies, each of said bodies being mounted on said printed board and constituted by a plurality of light-emitting elements which are different in wave length and provided integrally with each other;

light guide means guiding lights from said light-emitting element bodies onto a predetermined surface; and a substantially rectangular liquid crystal display for displaying while being illuminated by said light guide means;

wherein said light-emitting element bodies being disposed at intervals along one side of said rectangular liquid crystal display.

3. An illuminator as claimed in claim 2, wherein at least three said light-emitting element bodies are disposed at intervals along one side of said rectangular liquid crystal display.

4. An illuminator according to any one of claims 1 to 3, wherein said light-emitting elements can emit light simultaneously.

5. An illuminator according to any one of claims 1 to 3, wherein currents flowing into said light emitting elements are controlled to thereby change the intensity of illumination light.

6. A portable information apparatus comprising:

an illuminator including a printed board;

a plurality of light-emitting groups, each light-emitting group being mounted on the printed board and constituted by a plurality of light-emitting elements which are different in wave length and disposed at predetermined intervals;

light guide means guiding lights from said light-emitting element groups onto a predetermined surface; and a substantially rectangular liquid crystal display for displaying while being illuminated by said light guide means;

wherein said light-emitting element groups being disposed at intervals along one side of said rectangular liquid crystal display.

7. A portable information apparatus comprising:

an illuminator including a printed board;

light-emitting element bodies, each of said bodies being mounted on said printed board and constituted by a plurality of light-emitting elements which are different in wave length and provided integrally with each other;

light guide means guiding lights from said light-emitting element bodies onto a predetermined surface; and a substantially rectangular liquid crystal display for displaying while being illuminated by said light guide means;

wherein said light-emitting element bodies being disposed at intervals along one side of said rectangular liquid crystal display.

8. A portable information apparatus having a multicolored illuminator comprising:

a printed board;

light-emitting element bodies, each of the bodies being mounted on the printed board and constituted by a plurality of light-emitting elements which are different in wavelength and provided integrally with each other;

a light guide unit for guiding lights from the light-emitting element bodies onto a predetermined surface; and a liquid crystal display for displaying while being illuminated by the light guide unit, wherein the light guide unit includes a light path changing unit for changing light paths of lights emitted from the light-emitting element bodies, wherein the light-emitting element bodies are arranged along one side of the light guide unit so that the lights from the light-emitting element bodies are entered into one surface of the light guide unit.

9. A portable information apparatus according to claim 8, wherein the light path changing unit changes the light paths by reflection.

* * * * *